(12) United States Patent
Yasuda et al.

(10) Patent No.: US 9,709,041 B2
(45) Date of Patent: Jul. 18, 2017

(54) VARIABLE DISPLACEMENT AXIAL PISTON DEVICE

(71) Applicant: KANZAKI KOKYUKOKI MFG. CO., LTD., Amagasaki-shi, Hyogo (JP)

(72) Inventors: Toshifumi Yasuda, Amagasaki (JP); Yasuhisa Mochizuki, Amagasaki (JP); Hideaki Syokita, Amagasaki (JP); Hidemi Harada, Amagasaki (JP); Masaki Watanabe, Amagasaki (JP); Koji Sakata, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 578 days.

(21) Appl. No.: 14/085,332

(22) Filed: Nov. 20, 2013

(65) Prior Publication Data
US 2014/0140863 A1 May 22, 2014

(30) Foreign Application Priority Data

Nov. 22, 2012 (JP) .................................. 2012-256780

(51) Int. Cl.
| | | |
|---|---|---|
| F04B 1/20 | (2006.01) | |
| F04B 1/32 | (2006.01) | |
| F04B 27/08 | (2006.01) | |
| F01B 3/00 | (2006.01) | |

(52) U.S. Cl.
CPC .......... *F04B 1/2085* (2013.01); *F01B 3/0073* (2013.01); *F04B 1/322* (2013.01); *F04B 1/324* (2013.01); *F04B 27/0865* (2013.01); *F16C 2360/00* (2013.01)

(58) Field of Classification Search
CPC ........ F04B 1/2078; F04B 1/2085; F04B 1/32; F04B 1/322; F04B 1/324; F04B 27/086; F04B 27/0865; F04B 27/18; F04B 27/22; F01B 3/0073; F03C 1/0671
See application file for complete search history.

(56) References Cited

U.S. PATENT DOCUMENTS

| | | | | |
|---|---|---|---|---|
| 3,175,510 A | * | 3/1965 | D Amato | ................ F04B 1/124 91/505 |
| 3,266,434 A | * | 8/1966 | McAlvay | ................ F04B 1/324 417/222.1 |
| 3,933,083 A | * | 1/1976 | Weisenbach | .......... F04B 1/2064 91/504 |
| 4,269,574 A | * | 5/1981 | Bobier | .................. F04B 1/2071 417/222.1 |

(Continued)

FOREIGN PATENT DOCUMENTS

JP 11-201028 7/1999

*Primary Examiner* — Bryan Lettman
(74) *Attorney, Agent, or Firm* — Sterne, Kessler, Goldstein & Fox P.L.L.C.

(57) ABSTRACT

An outer circumferential surface of a trunnion shaft includes a sliding contact region that has a circular arc shape as viewed along a slanting axis line and is substantially brought into contact with an inner circumferential surface of the bearing portion in a rotatably sliding manner, and at least one suction groove that forms a pocket portion between the suction groove and the inner surface of the bearing portion. The pocket portion is opened to an inner space of housing on at least one side in an axis line direction of the trunnion shaft.

16 Claims, 14 Drawing Sheets

(56) References Cited

U.S. PATENT DOCUMENTS

| | | | | |
|---|---|---|---|---|
| 5,894,783 A | * | 4/1999 | Hauser | F01B 3/0044 417/269 |
| 6,109,032 A | * | 8/2000 | Shimizu | B60K 17/10 60/468 |
| 6,513,325 B2 | * | 2/2003 | Shimizu | B60K 17/10 60/468 |
| 6,701,825 B1 | * | 3/2004 | Langenfeld | F04B 1/324 60/487 |
| 6,793,463 B1 | * | 9/2004 | Ward | F04B 1/324 417/199.1 |
| 7,111,545 B1 | * | 9/2006 | Langenfeld | F04B 1/324 60/487 |
| 7,316,287 B2 | * | 1/2008 | Ohashi | F04B 53/16 180/305 |
| 7,484,365 B2 | * | 2/2009 | Ishii | B60K 17/105 60/487 |
| 8,276,503 B2 | * | 10/2012 | Cichon | F04B 1/2085 384/121 |
| 8,459,137 B1 | * | 6/2013 | McCoy | F16H 61/437 74/473.1 |

\* cited by examiner

VARIABLE DISPLACEMENT AXIAL PISTON DEVICE

BACKGROUND OF THE INVENTION

Field of the Invention

The present invention relates to a variable displacement axial piston device, and more particularly, relates to a variable displacement axial piston device with a trunnion type movable swash plate.

Related Art

In a variable displacement axial piston device that includes a cylinder block rotating around a rotational axis line, plural pistons accommodated in the cylinder block in a relatively non-rotatable manner around the axis line with respect thereto and in a reciprocating manner along the axis line, and a movable swash plate varying a reciprocating range of the plural pistons, a trunnion type movable swash plate has been widely used as the movable swash plate.

In more detail, the trunnion type movable swash plate includes a swash plate main body with which free end portions of the plural pistons engage, and a trunnion shaft that extends from the swash plate main body (see, for example, Japanese unexamined patent application publication No. H11-201023).

A supporting member such as a housing that accommodates the cylinder block is provided with a bearing portion that is coaxially aligned with a slanting reference axis line of the movable swash plate, and the trunnion shaft is supported by the bearing portion in a rotatable manner.

The swash plate main body is subjected to thrust force from the plural pistons. In the trunnion type movable swash plate, the trust force is received by the trunnion shaft and the bearing portion.

Accordingly, if a rotating frictional resistance between the trunnion shaft and the bearing portion is large, a large operational force to slant the trunnion type movable swash plate is needed so that the movable swash plate is difficult to be slanted rapidly.

In particular, in a case where the axial piston device is utilized as a hydraulic pump device of a traveling HST (hydrostatic transmission) provided in a working vehicle and the movable swash plate is slanted within a slanting range inclusive of a neutral position, the movable swash plate is needed to be returned to the neutral position as quickly as possible in order to shorten a braking distance in which the working vehicle is shifted from a traveling state to a stopping state.

SUMMARY OF THE INVENTION

In view of the prior art, it is an object of the present invention to provide a variable displacement axial piston device with a trunnion type movable swash plate capable of reducing a rotating frictional resistance as much as possible when the movable swash plate is being slanted while having a simplified configuration.

In order to achieve the object, the present invention provides a variable displacement axial piston device including a cylinder block that rotates around a rotational axis line, plural pistons that are accommodated in the cylinder block in a relatively non-rotatable manner around the rotational axis line with respect thereto and in a reciprocating manner along the rotational axis line with respect thereto, a trunnion type movable swash plate capable of varying a reciprocating range in which the plural pistons can move, and a housing that accommodates the cylinder block, wherein the movable swash plate includes a swash plate main body that has an engagement surface with which free ends of the plural pistons are engaged, and a trunnion shaft that extends outward in a radial direction of the rotational axis line and is supported in a rotatable manner by a bearing portion provided in the housing so as to be located coaxially with a slanting axis line, the variable displacement axial piston device being characterized in that an outer circumferential surface of the trunnion shaft includes a sliding contact region that has a circular arc shape as viewed along the slanting axis line and is substantially brought into contact with an inner circumferential surface of the bearing portion in a rotatably sliding manner, and at least one suction groove that forms a pocket portion between the suction groove and the inner surface of the bearing portion, and the pocket portion is opened to an inner space of the housing on at least one side in an axis line direction of the trunnion shaft.

In the variable displacement axial piston device according to the present invention, the outer circumferential surface of the trunnion shaft includes the sliding contact region that has a circular arc shape as viewed along the slanting axis line and is substantially brought into contact with an inner circumferential surface of the bearing portion in a rotatably sliding manner, and at least one suction groove that forms the pocket portion between the suction groove and the inner surface of the bearing portion, the pocket portion being opened to the inner space of the housing on at least one side in the axis line direction of the trunnion shaft. Accordingly, oil stored in the housing can be guided through the suction groove to the contact region between the outer circumferential surface of the trunnion shaft and the inner circumferential surface of the bearing portion, thereby reducing a rotating frictional resistance of the trunnion type movable swash plate at the time when it is being slanted around the slanting axis line while having a simplified configuration.

In one embodiment, the movable swash plate is configured so as to be slanted around the slanting axis line within a predetermined operable range including a neutral position. In this case, the suction groove is preferably provided at the trunnion shaft so as to be positioned on a side toward a first direction in which the plural pistons moves when they returns into the cylinder block from an imaginary plane, which passes the slanting axis line and is orthogonal to the rotational axis line, regardless of a position at which the movable swash plate is slanted within the predetermined operable range.

In a case where the predetermined operable range is defined by a normal rotating direction maximum slanting position at which the movable swash plate is positioned when it is slanted from the neutral position toward one side around the slanting axis line to a maximum degree and a reverse rotating direction maximum slanting position at which the movable swash plate is positioned when it is slanted from the neutral position toward the other side around the slanting axis line to a maximum degree, the suction groove is preferably arranged so as to be farthest away toward the first direction from the imaginary plane when the movable swash plate is positioned at the neutral position.

In any one of the above-explained various configurations, the bearing portion may include a concave portion that is provided at the housing so as to be opened inward in a radial direction of the rotational axis line and a bushing member inserted into the concave portion, and the trunnion shaft may include the outer circumferential surface that is brought into contact with the inner circumferential surface of the bushing member in a rotatably sliding manner, an outer end surface that faces outward in the radial direction of the rotational axis line and an inner end surface that faces inward in the radial direction of the rotational axis line.

In this case, the concave portion, the bushing member and the trunnion shaft are preferably arranged so that an oil chamber is formed between the outer end surface and a bottom surface of the concave portion, and the suction groove is configured so that a first end terminates at the outer end surface so as to communicate with the oil chamber and a second end terminates at a halfway area of the outer circumferential surface.

For example, the oil chamber is fluidly connected to the inner space of the housing through a communicating groove formed in the concave portion.

In a preferable configuration, the communicating groove is arranged so as to be located at the substantially same position as the suction groove around the slanting axis line at the time when the movable swash plate is located at the neutral position.

Alternatively, the oil chamber may be fluidly connected to a vicinity of contact area between the swash plate main body and the plural pistons through a communicating hole formed in the trunnion shaft.

The suction groove may be modified to extend from an outer end surface to an inner end surface of the trunnion shaft.

Specifically, in a configuration where the trunnion shaft includes the outer circumferential surface, the outer end surface that faces outward in the radial direction of the rotational axis line and the inner end surface that faces inward in the radial direction of the rotational axis line, the suction groove may be formed, so that a first end opens to the outer end surface and a second end opens to the inner end surface.

In this case, portions of the suction groove that are adjacent to the sliding contact region are formed into a convex shape projecting outward in the radial direction of the slanting axis line as viewed along the slanting axis line.

In order to achieve the object, the present invention also provides a variable displacement axial piston device including a cylinder block that rotates around a rotational axis line, plural pistons that are accommodated in the cylinder block in a relatively non-rotatable manner around the rotational axis line with respect thereto and in a reciprocating manner along the rotational axis line with respect thereto, a trunnion type movable swash plate capable of varying a reciprocating range in which the plural pistons can move, and a housing that accommodates the cylinder block, wherein the movable swash plate includes a swash plate main body that has an engagement surface with which free ends of the plural pistons are engaged, and a trunnion shaft that extends outward in a radial direction of the rotational axis line and is supported in a rotatable manner by a bearing portion provided in the housing so as to be located coaxially with a slanting axis line, the variable displacement axial piston device being characterized in that an outer circumferential surface of the trunnion shaft includes a large diameter portion that is positioned at a middle part in the axis line and is brought into contact with an inner circumferential surface of the bearing portion in a rotatably sliding manner, an outer side small diameter portion that is positioned on the outside of the large diameter portion in the axis line and is gradually away from the inner surface of the bearing portion as it goes outward in the axis line, and an inner side small diameter portion that is positioned on the inside of the large diameter portion in the axis line and is gradually away from the inner surface of the bearing portion as it goes inward in the axis line.

In the variable displacement axial piston device according to the present invention, the outer circumferential surface of the trunnion shaft includes the large diameter portion that is positioned at a middle part in the axis line and is brought into contact with the inner circumferential surface of the bearing portion in a rotatably sliding manner, the outer side small diameter portion that is positioned on the outside of the large diameter portion in the axis line and is gradually away from the inner surface of the bearing portion as it goes outward in the axis line and the inner side small diameter portion that is positioned on the inside of the large diameter portion in the axis line and is gradually away from the inner surface of the bearing portion as it goes inward in the axis line. Accordingly, oil stored in the housing can be guided through the suction groove to the contact region between the outer circumferential surface of the trunnion shaft and the inner circumferential surface of the bearing portion, thereby reducing a rotating frictional resistance of the trunnion type movable swash plate at the time when it is being slanted around the slanting axis line while having a simplified configuration.

DETAILED DESCRIPTION OF THE PREFERRED EMBODIMENTS

Hereinafter, one embodiment of a variable displacement axial piston device according to the present invention will be explained with reference to the accompanying drawings.

A variable displacement axial piston device 100 according to the present embodiment is embodied by a hydraulic pump device forming an HST (hydrostatic transmission) that is interposed in a traveling power transmission path extending from a driving power source 10 to a driving wheel 20.

Figure 1:
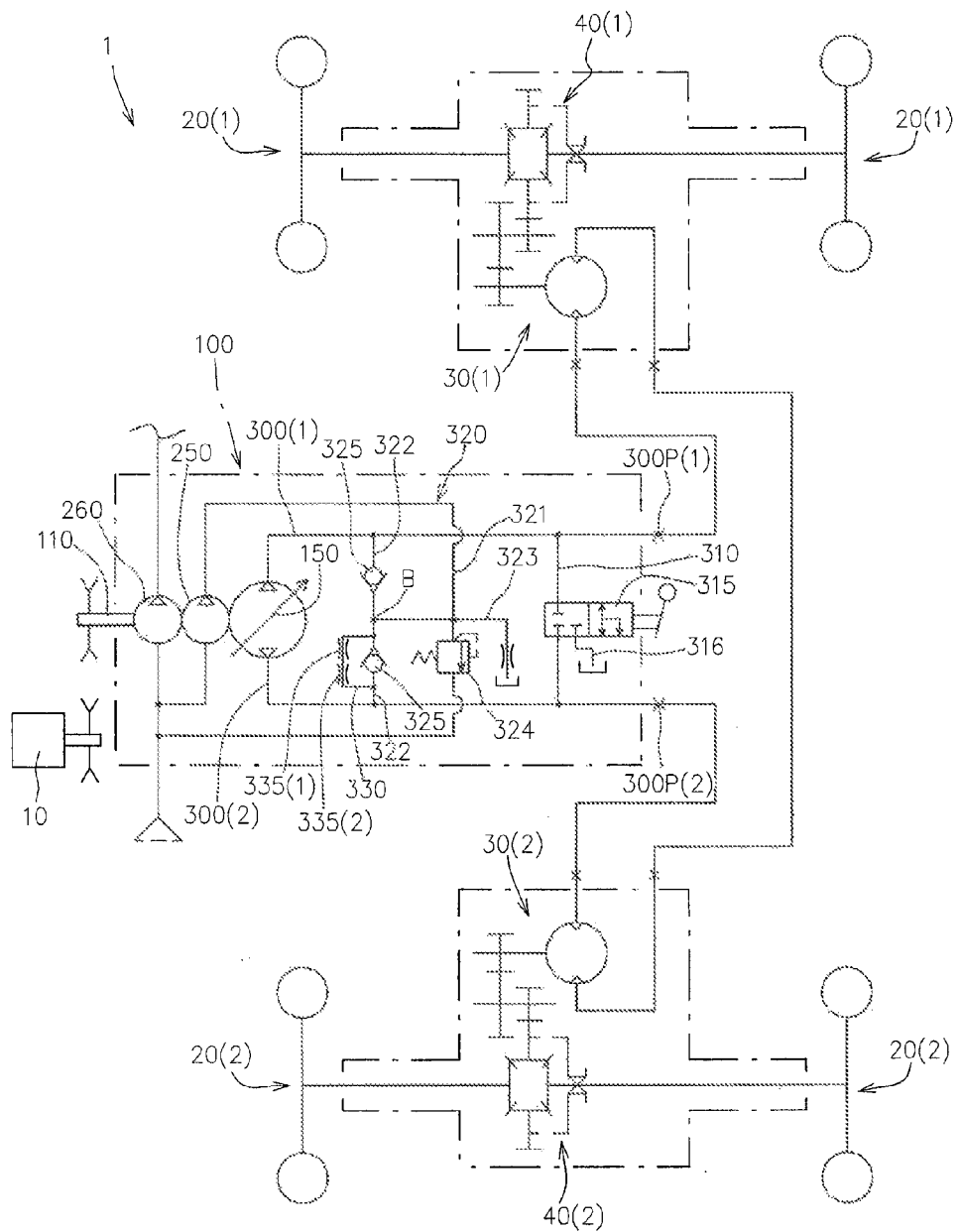
FIG. 1 is a hydraulic circuit diagram of a working vehicle to which an axial piston device according to one embodiment of the present invention is applied.

FIG. 1 is a hydraulic circuit diagram of a working vehicle 1 to which the axial piston device 100 according to the present embodiment is applied.

As shown in FIG. 1, the working vehicle 1 includes the driving power source 10, the driving wheel 20, the axial piston device 100 that is operatively driven by the driving power source 10 to function as the variable displacement hydraulic pump device, and a hydraulic motor device 30 that cooperates with the axial piston device 100 to form the HST.

In the embodiment shown in FIG. 1, the working vehicle 1 includes, as the driving wheel, paired right and left first driving wheels 20(1) that are arranged on one side in a vehicle longitudinal direction and paired right and left second driving wheels 20(2) that are arranged on the other side in the vehicle longitudinal direction, and also includes, as the hydraulic motor device 30, a first hydraulic motor device 30(1) that outputs rotational power toward the first driving wheels 20(1) and a second hydraulic motor device 30(2) that outputs rotational power toward the second driving wheels 20(2).

In the working vehicle 1, the first and second hydraulic motor devices 30(1), 30(2) are fluidly connected in series to the axial piston device 100.

In more detail, in the working vehicle 1, an operational oil discharged from the axial piston device 100 is supplied to the first hydraulic motor device 30(1), the operational oil returned from the first hydraulic motor device 30(1) is then supplied to the second hydraulic motor device 30(2), and the operational oil returned from the second hydraulic motor device 30(2) is then supplied to the axial piston device 100.

The working vehicle 1 further includes a first differential gear device 40(1) transmitting the rotational power, which is output by the first hydraulic motor device 30(1), to the paired first driving wheels 20(1) in a differential manner, and a second differential gear device 40(2) transmitting the rotational power, which is output by the second hydraulic motor device 30(2), to the paired second driving wheels 20(2) in a differential manner.

Figure 2:
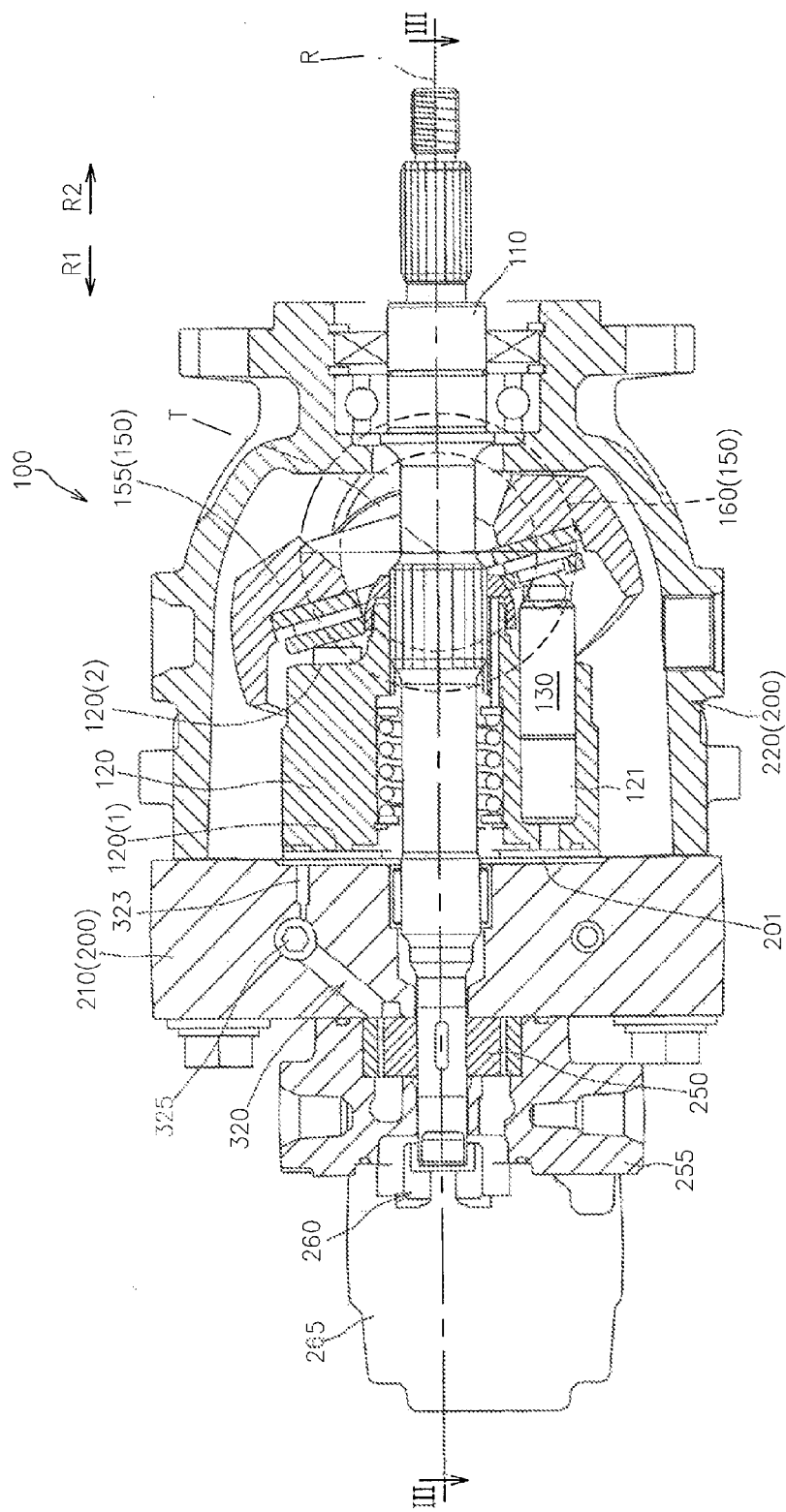
FIG. 2 is a vertical cross sectional view of the axial piston device shown in FIG. 1.

FIG. 2 is a vertical cross sectional view of the axial piston device 100 according to the present embodiment.

Figure 3:
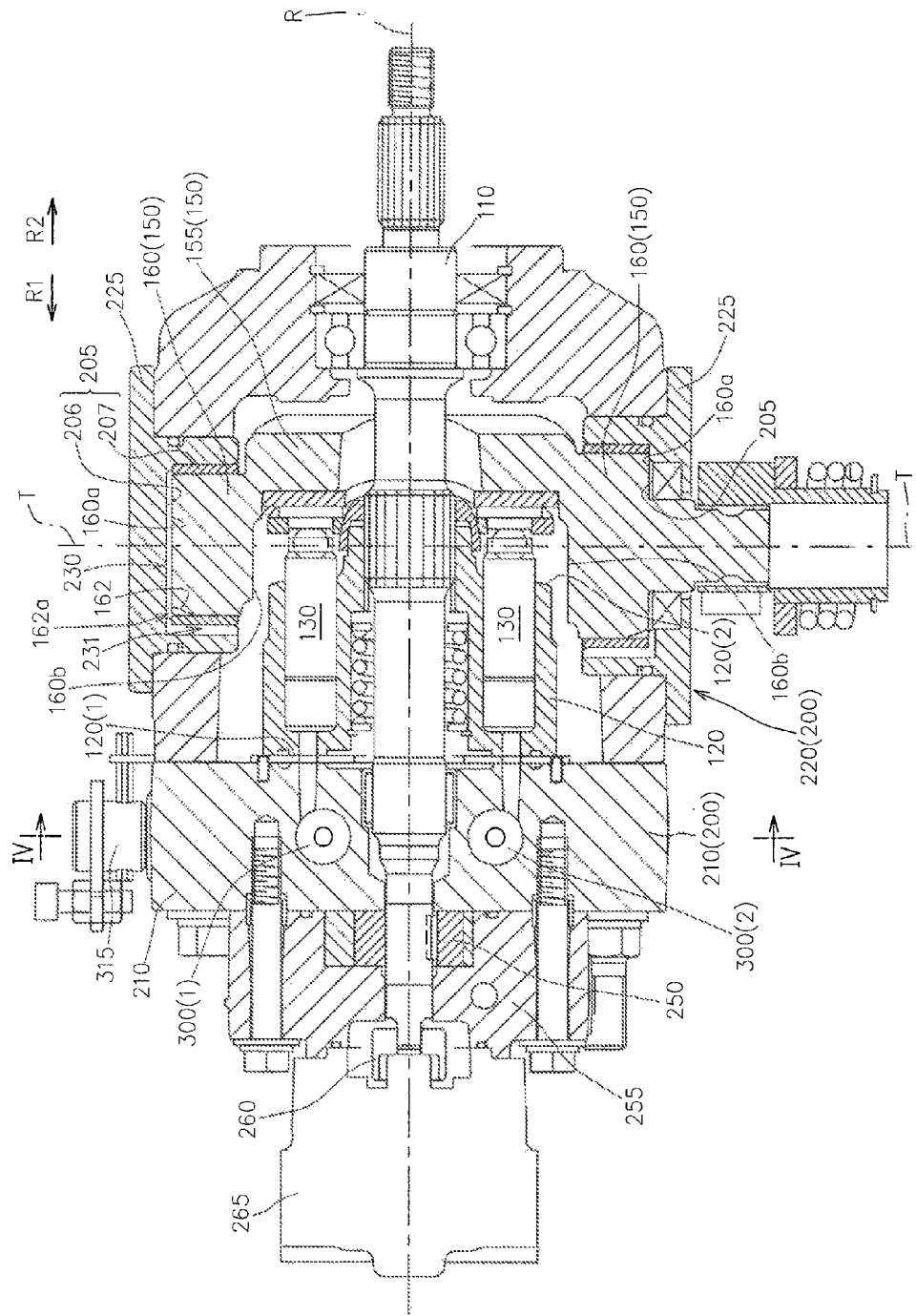
FIG. 3 is a cross sectional view taken along the line III-III in FIG. 2.

FIG. 3 is a cross sectional view taken along the line in FIG. 2.

As shown in FIGS. 2 and 3, the axial piston device 100 includes a rotational shaft 110, a cylinder block 120 supported by the rotational shaft 110 in a relatively non-rotatable manner with respect thereto, plural pistons 130 accommodated in the cylinder block 120, a trunnion type movable swash plate 150 changing a direction and an amount of the operational oil suctioned and discharged by the cylinder block 120 and the plural pistons 130, and a housing 200 accommodating the cylinder block 120 and supporting the rotational shaft 110 and the trunnion type movable swash plate 150 in a rotatable manner.

The cylinder block 120 includes first and second end surfaces 120(1), 120(2) that face to one side R1 and the other side R2 in an axis line direction of the rotational shaft 110.

The cylinder block 120 is formed with plural accommodating holes 121 that are arranged around the rotational shaft 110 in a state where they are along the axis line direction thereof and opened to the second end surface 120(2).

The plural pistons 130 are accommodated in the plural accommodating holes 121 in a reciprocating manner along the axis line direction R of the rotational shaft 110 in a state where they have free end portions extending toward the other side R2 in the axis line direction of the rotational shaft 110.

The trunnion type movable swash plate 150 is supported by the housing 200 in a tilting manner around a tilting axis line T, and defines an extendable range in which the plural pistons 130 can move outward in the rotational axis line in accordance with the tilting angle around the tilting axis line T.

In more detail, as shown in FIGS. 2 and 3, the first end surface 120(1) of the cylinder block 120 is engaged with a sliding contact surface 201 provided in the housing 200 in a relatively rotatable manner around the axis line direction of the rotating shaft 110 with respect to the sliding contact surface 201, thereby preventing a displacement of the cylinder block 120 toward the one side R1 in the axis line direction of the rotational shaft 110. In this configuration, the plural pistons 130 are accommodated in the plural accommodating holes 121 that are opened to the second end surface 120(2) of the cylinder block 120.

The movable swash plate 150 includes a swash plate main body 155 and a trunnion shaft 160. The swash plate main body 155 has an engagement surface with which the free end portions of the plural pistons 130 are engaged. The trunnion shaft 160 extends from the swash plate main body 155 outward in a radial direction of the rotational shaft 110, and is supported by a bearing portion 205 provided in the housing so as to be coaxially with the slanting axis line T.

The movable swash plate 150 changes the extendable range of the plural pistons 130 in accordance with a slanting angle of the trunnion shaft 160 around the slanting axis line T.

In the present embodiment, the movable swash plate 150 includes paired first and second trunnion shafts 160 that are arranged on one side and the other side in the slanting axis line T so as to sandwich the swash plate main body 155.

One of the first and second trunnion shafts 160 extends outward from the housing 200 so as to be operated from outside.

The housing 200 supports the rotational shaft 110 in a rotatable manner around its axis line R while accommodating the cylinder block 120 supported by the rotational shaft 110, and also supports the trunnion shaft 160 in a rotatable manner around its axis line (the slanting axis line T) in a state where the free end portions of the plural pistons 130 can be engaged with the swash plate main body 155.

The axial piston device 100 according to the present embodiment functions as the hydraulic pump device, as explained earlier.

Accordingly, the rotational shaft 110 is supported by the housing 200 in a state where one end thereof extends outward from the housing 200 so as to be operatively connected to the driving power source 10.

The housing 200 is formed with paired operational oil passages 300(1), 300(2) through which the operational oil suctioned and discharged by the cylinder block 120 is flowed.

In the present embodiment, as shown in FIGS. 2 and 3, the housing 200 includes a port block 210 and a housing main body 220. The port block 210 has the sliding contact surface 201 and the paired operational oil passages 300(1), 300(2). The housing main body 220 has a hollow portion forming an accommodating space for the cylinder block 120 and is detachably connected to the port block 210.

Figure 4:
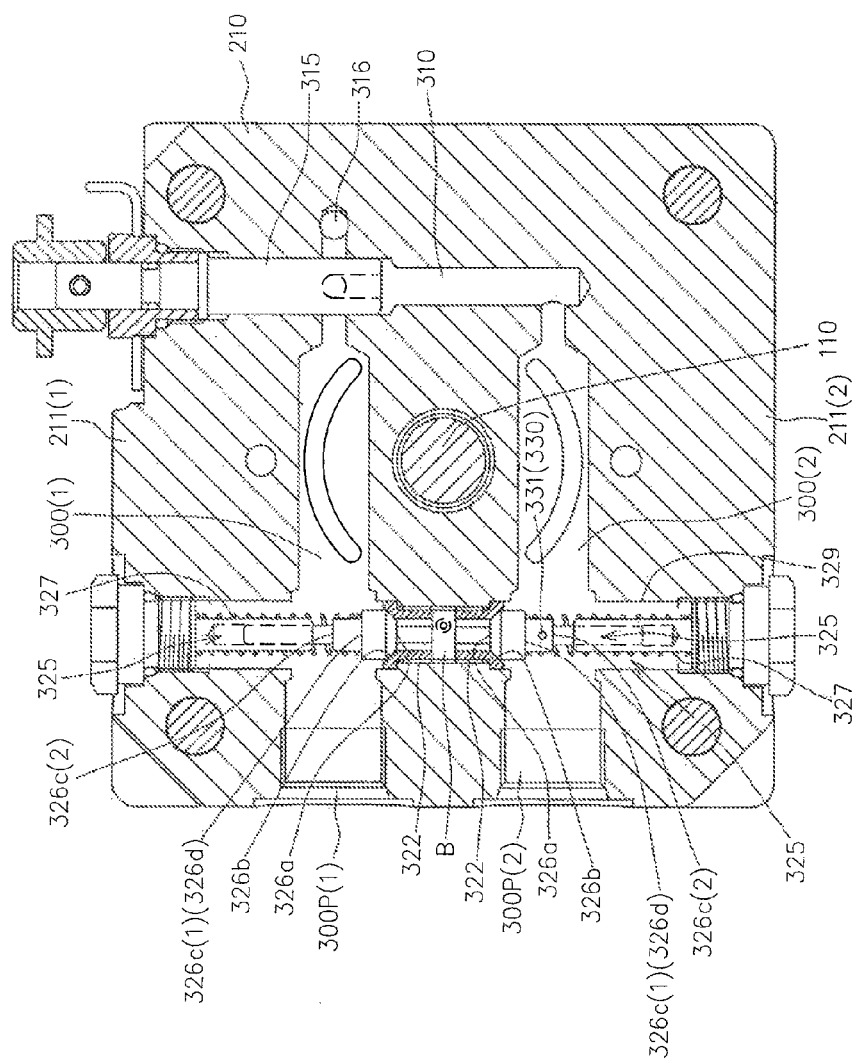
FIG. 4 is a cross sectional view taken along the line IV-IV in FIG. 3

FIG. 4 is a cross sectional view taken along the line IV-IV in FIG. 3.

As shown in FIGS. 1 and 4, the port block 210 is further formed with a bypass oil passage 310 and a charge oil passage 320 in addition to the paired operational oil passages 300(1), 300(2). The bypass oil passage 310 fluidly connects the paired operational oil passages 300(1), 300(2). The charge oil passage 320 is for replenishing the paired operational oil passages 300(1), 300(2) with operational oil.

As shown in FIGS. 1 and 4, a bypass valve 315 is interposed in the bypass oil passage 310.

The bypass valve 315 can selectively realize a shutoff state in which the paired operational oil passages 300(1), 300(2) are fluidly disconnected to each other, and a opened state in which the paired operational oil passages 300(1), 300(2) are opened to a reservoir.

Specifically, the port block 210 is formed with a drain oil passage 316 having one end fluidly connected to the bypass valve 315 and the other end opened into an inner space of the housing 200.

The bypass valve 315 can selectively take a shutoff position that brings the bypass oil passage 310 into a shutoff state and also fluidly disconnects the drain oil passage 316 to the bypass oil passage 310, and a communicating position that brings the bypass oil passage 310 into a communicating state and also fluidly connects the drain oil passage 316 to the bypass oil passage 310.

The charge oil passage 320 includes a common oil passage 321 and paired branched oil passages 322. The common oil passage 321 has an upstream end fluidly connected to the reservoir. The paired branched oil passages 322 are divided into two directions at a downstream end (hereinafter referred to as branch point B) of the common oil passage 322.

The paired branched oil passages 322 are fluidly connected to the paired operational oil passages 300(1), 300(2) via paired check valves 325, respectively.

The paired check valves 325 each allow a charge oil to flow from the branch point B to the corresponding operational oil passage 300(1), 300(2) while preventing a reverse flow.

As shown in FIG. 1, the charge oil passage 320 further includes a self-suction oil passage 323 and a charge relief valve 324. The self-suction oil passage 323 has one end fluidly connected to the inner space of the housing 200 and the other end fluidly connected to an upstream side of the paired check valves 325 in a flow direction of the charge oil. The charge relief valve 324 sets an oil pressure of the charge oil passage 320.

As shown in FIG. 1, in the working vehicle 1, at least one of the paired branched oil passages 322 is provided with a communicating oil passage 330 that is arranged in parallel with the check valve 325 and fluidly connects the branch point B to the corresponding operational oil passage 300(2). An orifice is interposed in the communicating oil passage 330.

The communicating oil passage 330 with the orifice 335 is provided in order to enlarge a neutral range of the HST.

In detail, in order to bring the HST into a neutral state, the movable swash plate 150 of the axial piston device 100 that functions as the variable displacement hydraulic pump device has to be exactly positioned at a neutral position so that the amount of the operational oil suctioned and discharged by the axial piston device 100 becomes substantially zero.

However, it is difficult to exactly position the movable swash plate at the neutral position due to manufacturing error, assembling error or the like.

In this regard, the communicating oil passage 330 with the orifice 335 causes the operational oil of the amount defined by the orifice 335 to flow out from the corresponding operational oil passage 300(2) to the reservoir (the inner space of the housing 200 in the illustrated embodiment) even if the movable swash plate 150 is not exactly positioned at the neutral position. Accordingly, a differential pressure between the paired operational oil passages 300(1), 300(2) can be substantially kept at a zero so that the HST is brought into the neutral state without exactly positioning the movable swash plate at the neutral position.

Meanwhile, although the communicating oil passage 330 with the orifice 335 is useful in realizing the neutral state of the HST, it has a negative effect on a transmission efficiency of the HST.

Specifically, the operational oil of the amount defined by the orifice 335 of the communicating oil passage 330 constantly flows out from the corresponding operational oil passage 300(2) to the reservoir. Accordingly, when the HST is in an outputting state of outputting a rotational power (that is, the working vehicle is in a traveling state), the communicating oil passage 330 worsens the transmission efficiency of the HST.

Therefore, it is preferable to reduce an opening diameter or size as small as possible within a range that realizes the neutral state of the HST. However, it is troublesome to form the orifice having a small opening diameter in view of machinability.

In this regard, as shown in FIG. 1, the present embodiment includes, as the orifice 335, first and second orifices 335(1) that are arranged in series to each other. The configuration makes it possible to limit the amount of the operational oil that flow out from the corresponding operational oil passage 300(2) without reducing the opening diameters of the first and second orifices 335(1), 335(2).

In the present embodiment, the first and second orifices 335(1), 335(2) are formed at one of the paired check valves 325.

Specifically, as shown in FIG. 4, the paired operational oil passages 300(1), 300(2) are formed in the port block 210 so that they are substantially orthogonal to the rotational shaft 110 and are in parallel with each other with the rotational shaft 110 being sandwiched between them.

The paired operational oil passages 300(1), 300(2) have first ends opened to an outer surface of the port block 210 to form paired connection ports 300P(1), 300P(2) (see FIGS. 1 and 4).

The port block 210 is formed with an installation oil passage 329 that intersects with the paired operational oil passages 300(1), 300(2), as shown in FIG. 4.

The installation oil passage 329 has first and second ends opened to first and second outer side surfaces 211(1), 211(2) of the port block 210 while fluidly connecting the paired operational oil passages 300(1), 300(2).

As shown in FIG. 4, a portion of the installation oil passage 329 that is positioned between the paired operational oil passages 300(1), 300(2) functions as the paired branched oil passages 322.

In the configuration, the paired check valves 325 are inserted into the installation oil passage 329 from the first and second ends thereof.

The check valve 325 selectively connects or disconnects the branch oil passage 322 and the corresponding operational oil passage 300(1).

Specifically, as shown in FIG. 4, the check valve 325 includes a check valve main body 326 inserted into the installation hole 329, and a biasing member 327 pressing the check valve main body 326 toward a shutoff direction.

The check valve main body 326 includes a charge pressure receiving surface 326a that receives the oil pressure of the charge oil passage 320, a seat surface 326b that can be seated at a valve sheet arranged between the corresponding operational oil passage 300(1) (300(2)) and the branched oil passage 322, a pressure receiving surface 326c that receives the oil pressure of the corresponding operational oil passage 300(1) (300(2)), and an engagement surface 326d with which a first end side of the biasing member 327 is engaged.

In the illustrated embodiment, the check valve main body 326 includes, as the pressure receiving surface 326c, first and second pressure receiving surfaces 326c(1), 326c(2), and the first pressure receiving surface 326c(1) also functions as the engagement surface 326d.

The communicating oil passage 330 inclusive of the first and second orifices 335(1), 335(2) is formed in the check valve main body 326 of one check valve of the paired check valves 325.

In the present embodiment, as shown in FIG. 4, the communicating oil passage 330 is formed in the check valve main body 326 of the one check valve 325 that acts on the operational oil passage 300(2).

Figure 5:
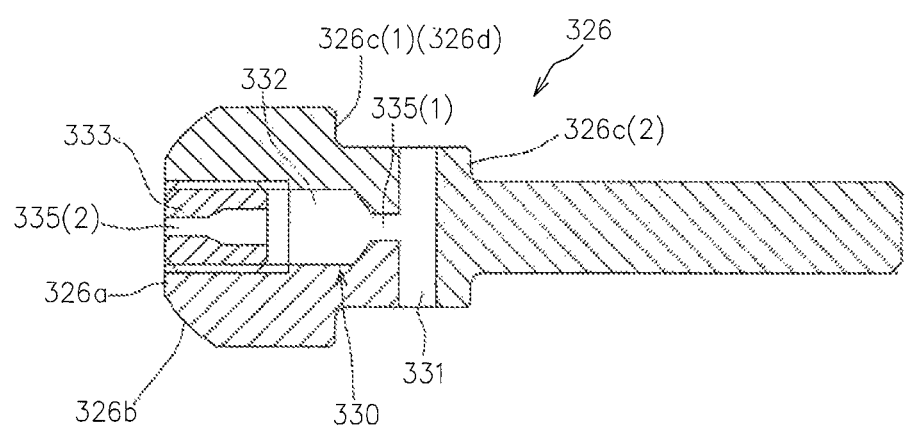
FIG. 5 is a cross sectional view of a check valve main body of one of paired check valves provided in the axial piston device.

FIG. 5 is a cross sectional view of the check valve main body 326 of the one check valve 325.

As shown in FIG. 5, the communicating oil passage 330 includes an operational oil passage communicating portion 331 that fluidly connects to the corresponding operational oil passage (the operational oil passage 300(2) in the present embodiment), a branched oil passage communicating portion 332 that fluidly connects to the corresponding branched oil passage 322, the first orifice 335(1) arranged between the operational oil passage communicating portion 331 and the branched oil passage communicating portion 332, and the second orifice 335(2) formed in an orifice member 333 that is detachably inserted into the branched oil passage communicating portion 332.

As explained above, the present embodiment includes, as the orifice 335, the first and second orifices 335(1), 335(2) that are arranged in series, thereby restricting the amount of the operational oil that flows out from the corresponding operational oil passage (the operational oil passage 300(2) in the present embodiment) without narrowing the respective opening diameters or sizes of the first and second orifices 335(1), 335(2).

The communicating oil passage 330 with the orifice 335 is preferably arranged between the branched oil passage 322 and one of the operational oil passages that becomes a high pressure side at the time when the vehicle moves rearward.

The configuration makes it possible to realize the neutral state of the HST while minimalizing disadvantage that the transmission efficiency of the HST becomes worsened since a total rearward movement time period in which the vehicle moves rearward is normally shorter than a total forward movement time period.

As shown in FIGS. 1 to 3, the axial piston device 100 according to the present embodiment further includes a first auxiliary pump 250 that functions as an oil source for the charge oil passage 320.

Accordingly, the upstream end of the charge oil passage 320 is fluidly connected to a discharge side of the first auxiliary pump 250.

Specifically, the first auxiliary pump 250 is arranged outside the port block 210 and is supported by the rotational shaft 110. A first auxiliary pump case 255 is connected to the port block 210 so as to enclose the first auxiliary pump 250.

As shown in FIGS. 1 to 3, the axial piston device 100 according to the present embodiment further includes a second auxiliary pump 260 operatively driven by the rotational shaft 110, and a second auxiliary pump case 265 connected to the first auxiliary pump case 255 so as to enclose the second auxiliary pump 260.

For example, the second auxiliary pump may function as an oil pressure source for any hydraulic devices attached to the working vehicle 1.

Now, a configuration provided in the axial piston device 100 according to the present embodiment in order to reduce the rotating frictional resistance of the movable swash plate 150 as much as possible when it is being slanted.

Figure 6:
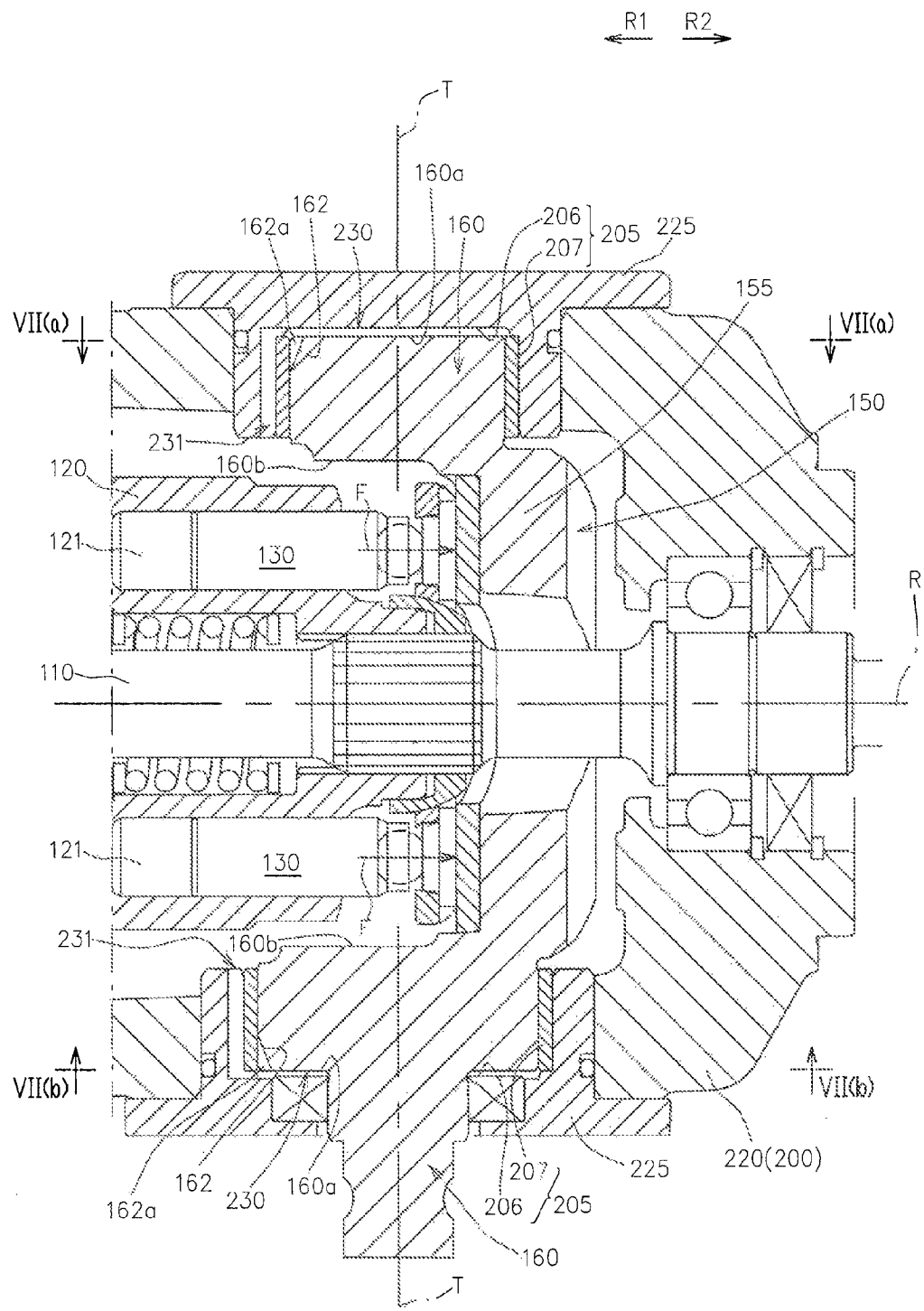
FIG. 6 is an enlarged cross sectional view of a vicinity of a movable swash plate of the axial piston device.

FIG. 6 is an enlarged view of a vicinity of the movable swash plate 150.

Figure 7A:
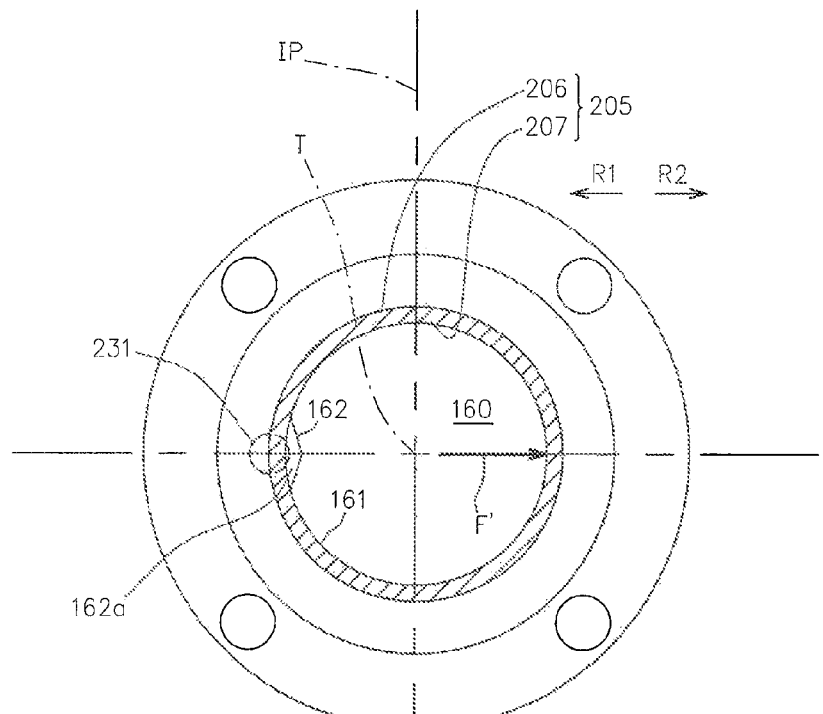
FIGS. 7A and 7B are cross sectional views taken along lines VII(A)-VII(A) and VII(B)-VII(B) in FIG. 6, respectively.
Figure 7B:
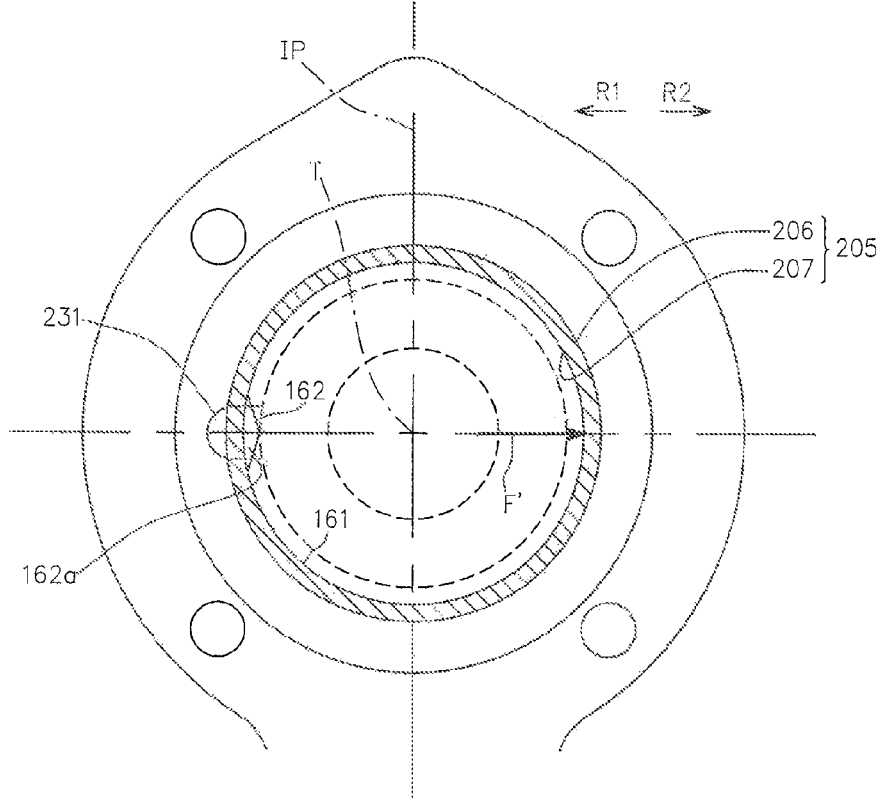

FIGS. 7A and 7B are cross sectional views taken along lines VII(A)-VII(A) and VII(B)-VII(B) in FIG. 6, respectively.

As shown in FIGS. 3, 6, 7A and 7B, the trunnion shaft 160 has an outer circumferential surface including a sliding contact region 161 and at least one suction groove 162. The sliding contact surface 161 has a circular arc shape as viewed along the slanting axis line T and is substantially brought into contact with an inner circumferential surface of the hearing portion 205 in a rotatably sliding manner. The suction groove 162 is configured to form a pocket portion 162a between the suction groove 162 and the inner surface of the bearing portion 205, and is opened to the inner space of the housing 200 on at least one side in the axis line direction of the trunnion shaft 160.

A formation of the suction groove 162 at the outer circumferential surface of the trunnion shaft 160 makes it possible to cause the oil stored in the housing 200 to effectively flow into a contact area between the outer circumferential surface of the trunnion shaft 160 and the inner circumferential surface of the bearing portion 205 and function as a lubricating oil in accordance with the rotation of the trunnion shaft around its axis line.

Accordingly, the rotating frictional resistance of the movable swash plate 150 when it is being slanged can be reduced as much as possible.

As described above, the axial piston device 100 according to the present embodiment is utilized as the variable displacement hydraulic pump device that functions as one component of the traveling HST in the working vehicle 1 and can selectively take the neutral state.

In this case, it is possible to reduce a braking distance of the working vehicle 1 as much as possible by reducing the rotating frictional resistance of the movable swash plate 150 as much as possible.

Meanwhile, the plural pistons 130 reciprocate along the axis line of the rotational shaft 110 with respect to the cylinder block 120.

In detail, the plural pistons 130 each return hack into the cylinder block 120 by a relative movement toward a first direction R1 (see FIG. 2) that is one side direction in the axis line of the rotational shaft 110 with respect to the cylinder block 120, and also move outward from the cylinder block 120 by a relative movement toward a second direction R2

(see FIG. 2) that is the other one side direction in the axis line of the rotational shaft 110 with respect to the cylinder block 120.

At the time when the plural pistons 130 perform reciprocating movement, the trust force F toward the second direction R2 is applied from the plural pistons 130 to the swash plate main body 155. The trust force F is received by the trunnion shaft 160 and, the bearing portion 205.

Figure 8:
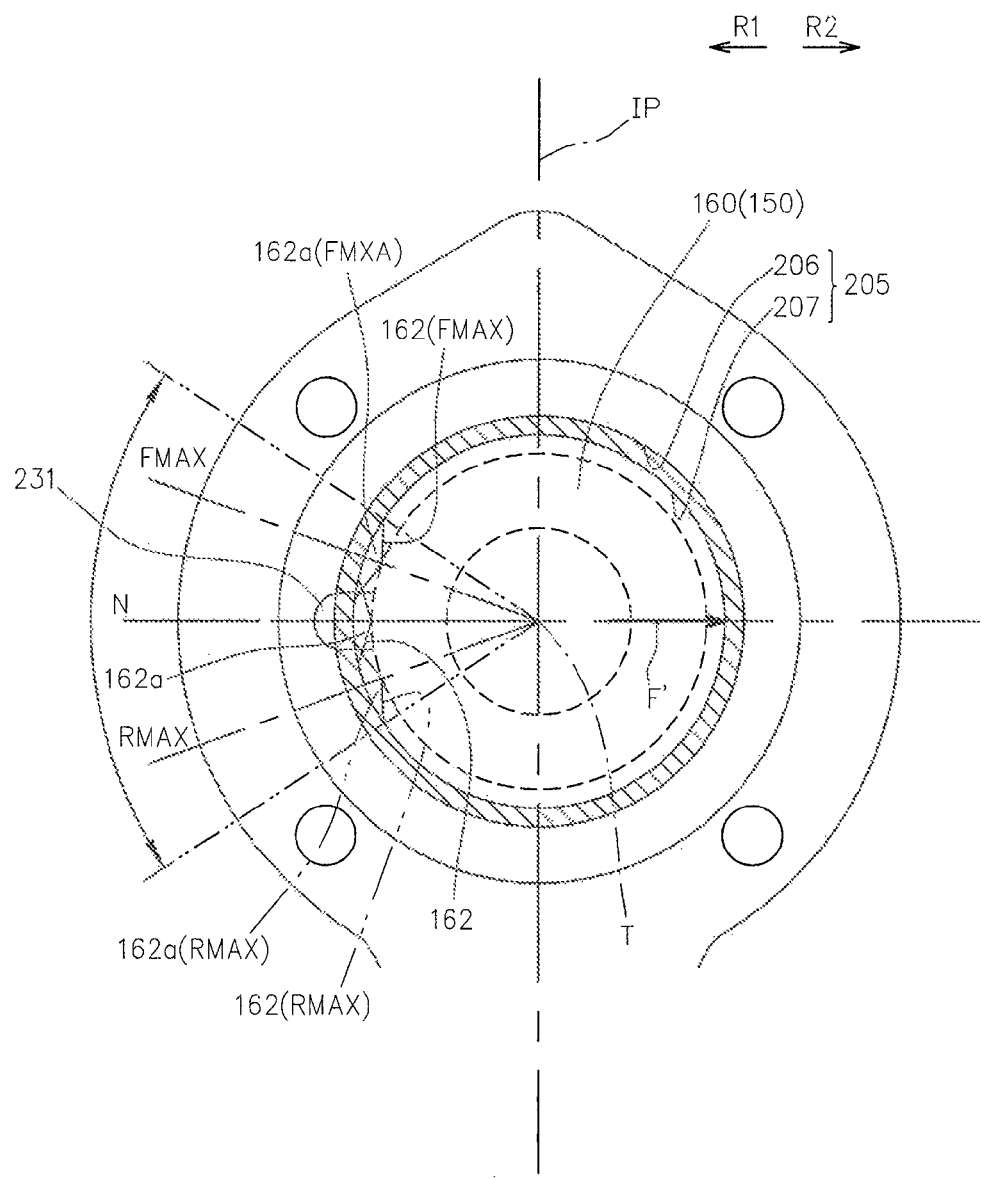
FIG. 8 is a cross sectional view corresponding to FIG. 7B, and shows a slanting range in which the movable swash plate can be slanted.

That is, the outer circumferential surface of the trunnion shaft 160 is pressed toward the second direction R2 to the inner circumferential surface of the bearing portion 205 by a force F' (see FIGS. 7A and 7B) based on the trust force F In a preferable configuration, as shown in FIG. 8, the suction groove 162 is provided at the trunnion shaft 160 so as to be positioned on a side toward the first direction R1 from an imaginary plane IP, which passes the slanting axis line T and is orthogonal to the rotational axis line R, regardless of a position to which the movable swash plate 150 is slanted around the slanting axis line T within the predetermined operable range.

The preferable configuration can realize a following effect.

A region of the outer circumferential surface of the trunnion shaft 160 that is positioned on the opposite side of the suction groove 162 with respect to the slanting axis line T is pressed against the inner circumferential surface of the bearing portion 205 by the force F', as shown in FIG. 8. As a result, a gap occurs between the inner circumferential surface of the bearing portion 205 and a region of the outer circumferential surface of the trunnion shaft 160 that is close to the suction groove 162, the gap facilitating inflow of the oil within the pocket portion 162a into the contact area between the inner circumferential surface of the bearing portion 205 and the outer circumferential surface of the trunnion shaft 160.

Accordingly, the rotating frictional resistance of the trunnion shaft 160 with respect to the bearing portion 205 can be effectively reduced.

In the present embodiment, a slanting range in which the movable swash plate 150 can be slanted is defined by a normal rotating direction maximum slanting position Fmax at which the movable swash plate 150 is positioned when it is slanted from the neutral position toward one side around the slanting axis line T to a maximum degree and a reverse rotating direction maximum slanting position Rmax at which the movable swash plate 150 is positioned when it is slanted from the neutral position toward the other side around the slanting axis line T to a maximum degree, as shown in FIG. 8.

In this case, the suction groove 162 is arranged so as to be farthest away toward the first direction R1 from the imaginary plane IP when the movable swash plate is positioned at the neutral position N, as shown in FIG. 8.

The configuration can realize a state in which the oil in the suction groove 162 easily flows into the contact region between the outer circumferential surface of the trunnion shaft 160 and the inner circumferential surface of the bearing portion 205 even if the movable swash plate 150 is slanted in either of the normal rotation direction and the reverse rotation direction. Thus, the rotating frictional resistance of the movable swash plate 150 at the time when it is being returned to the neutral position from both a normal rotating side and a reverse rotating side can be effective reduced.

Reference numerals 162(Rmax) and 162a(Rmax) respectively denote the suction groove and the pocket portion at the time when the movable swash plate 150 is located at the reverse rotating direction maximum slanting position Rmax.

Reference numerals 162(Fmax) and 162a(Fmax) respectively denote the suction groove and the pocket portion at the time when the movable swash plate 150 is located at the normal rotating direction maximum slanting position Rmax.

As shown in FIGS. 6 to 8 or the like, in the present embodiment, the bearing portion 205 includes a concave portion 206 that is arranged directly or indirectly at the housing 200 so as to be opened inward in a radial direction of the rotational axis line R, and a bushing member 207 inserted into the concave portion 206.

In the illustrated embodiment, the housing main body 220 is formed with a through-hole that communicates between the inside and the outside of the housing main body 220. A cap member 225 is detachably mounted into the through-hole, and the concave portion 206 is formed in the cap member 206.

The trunnion shaft 160 includes the outer circumferential surface that is brought into contact with the inner circumferential surface of the bushing member 207, an outer end surface 160a that faces outward in the radial direction of the rotational axis line R, and an inner end surface that faces inward in the radial direction of the rotational axis line R.

In the configuration, the concave portion 206, the bushing member 207 and the trunnion shaft 160 are arranged so that an oil chamber 230 is formed between the outer end surface 160a and a bottom surface of the concave portion 206.

In the present embodiment, as shown in FIGS. 6 to 8, the concave portion 206 is formed with a communicating groove 231 at an inner circumferential surface so that the oil chamber 230 is fluidly connected to the inner space of the housing 200 through the communicating groove 231.

In the present embodiment, as shown in FIG. 6, the suction groove 162 has a first end terminated at the outer end surface 160a so as to communicate with the oil chamber 230 and a second end terminated at a halfway area of the outer circumferential surface in the axis line of the trunnion shaft 160.

As described above, in the present embodiment, the Suction groove 162 is not formed over the entire length along the axis line direction of the trunnion shaft 160, but is formed so that the first end is opened at the outer end surface 160a of the trunnion shaft 160 and the second end is opened at a halfway area of the outer circumferential surface in the axis line of the trunnion shaft 160. The configuration makes it possible to effectively facilitate inflow of oil into the contact area between the outer circumferential surface of the trunnion shaft 160 and the inner circumferential surface of the bushing member 207 through the suction groove 162 while stabilizing support of the trunnion shaft 160 by the busing member 207.

The communicating groove 231 is preferably arranged so as to be located at the substantially same position as the suction groove 162 around the slanting axis line T at the time when the movable swash plate 150 is located at the neutral position N as shown in FIGS. 7A, 7B and 8.

The configuration causes the suction groove 162 to be located near the communication groove 231 regardless of the position at which the movable swash plate 150 is located within the slanting range, thereby improving an efficiency of inflow of the oil into the contact area between the outer circumferential surface of the trunnion shaft 160 and the inner circumferential surface of the bushing member 207.

It is off course possible to achieve the inflow of the oil into the oil chamber 230 by various configurations.

Figure 9:
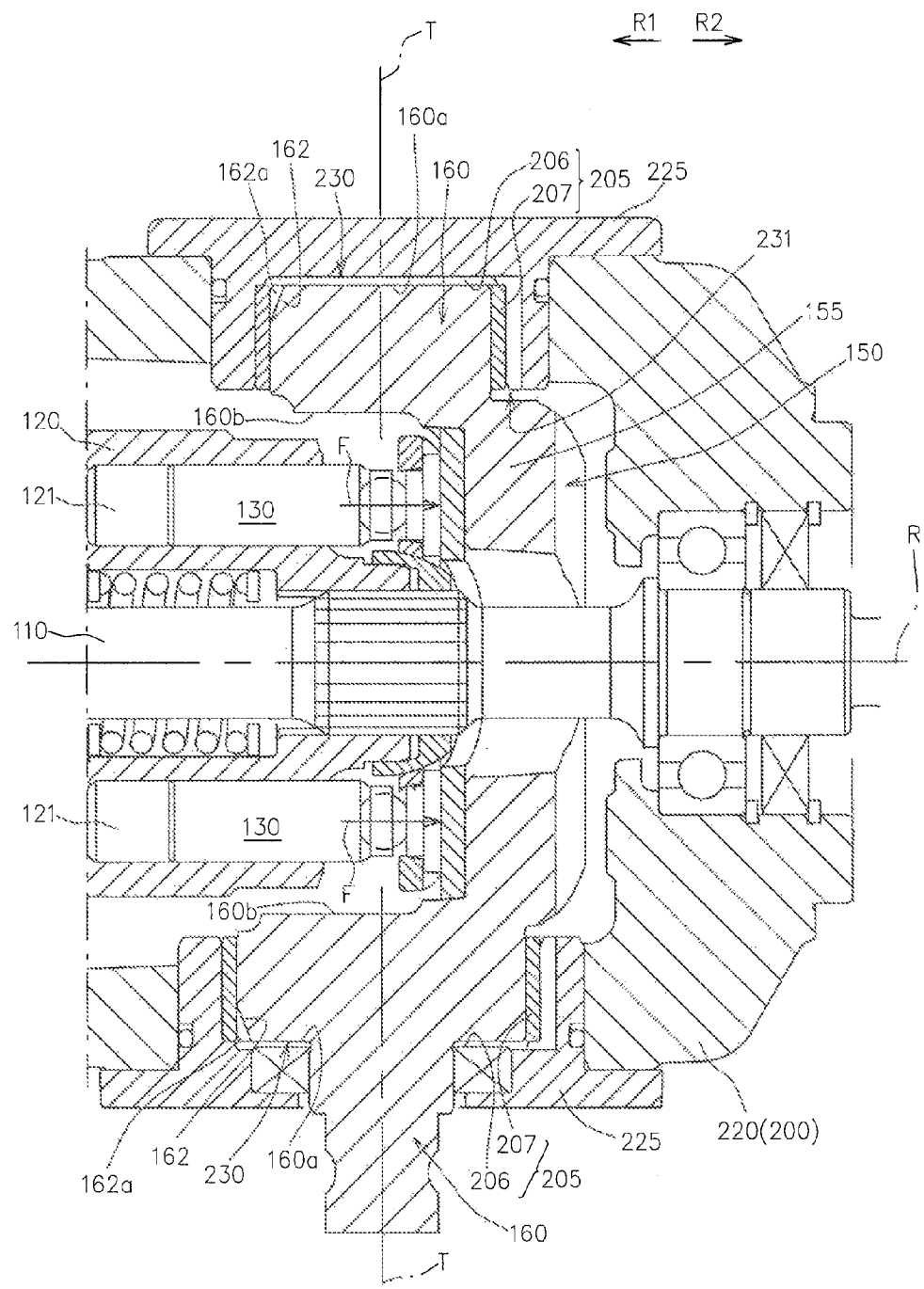
FIG. 9 is a partial cross sectional view of an axial piston device according to a modified example of the one embodiment.

For example, the communicating groove 231 can be positioned on the opposite side of the suction groove 162 in a circumferential direction with respect to the slanting axis line T, as shown in FIG. 9.

Figure 10:
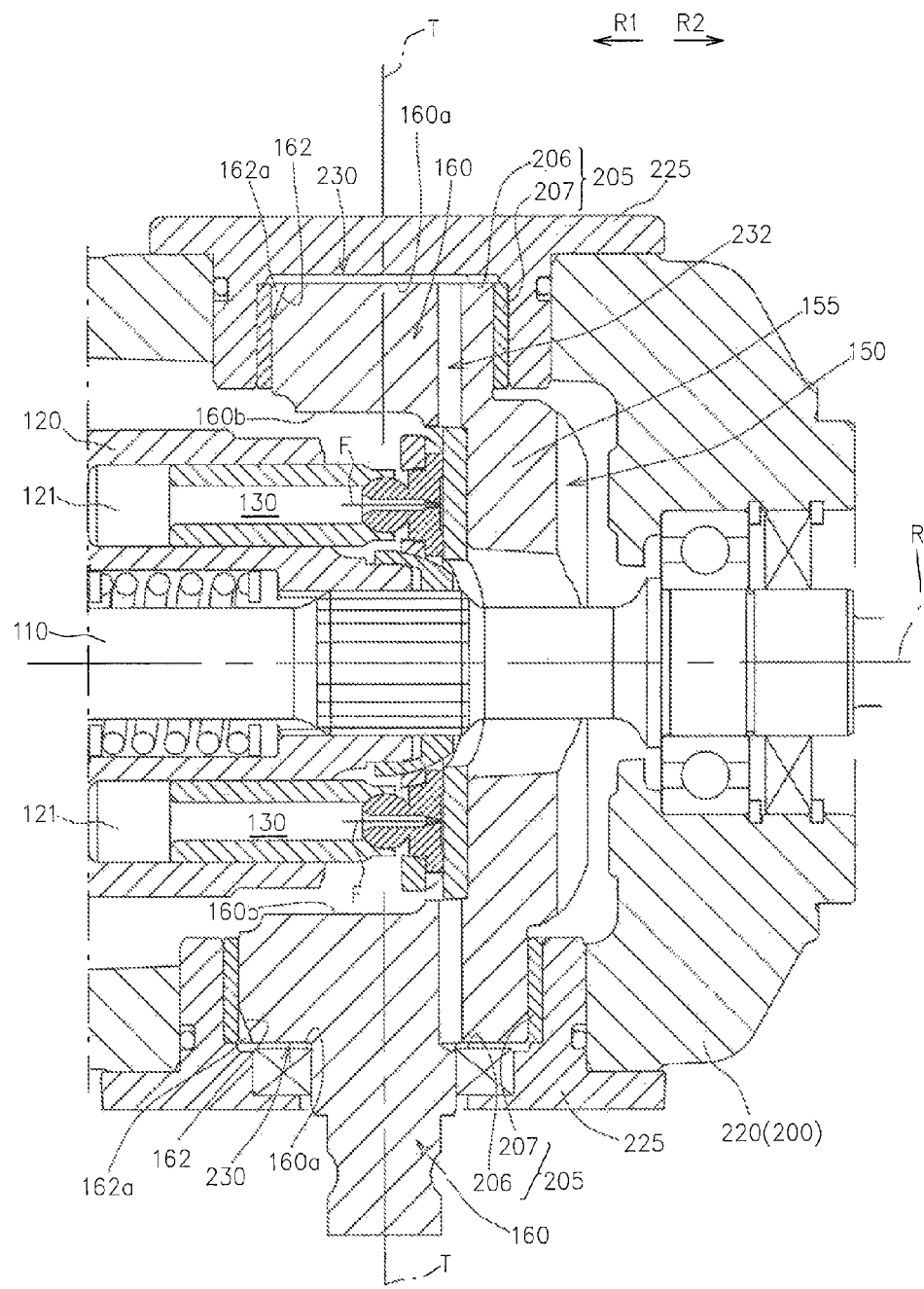
FIG. 10 is a partial cross sectional view of an axial piston device according to another embodiment of the present invention.

Alternatively, it is also possible that the oil flows into the oil chamber 230 through a communicating hole 232 that is formed in the trunnion shaft 160, as shown in FIG. 10.

In the configuration shown in FIG. 10, the communicating hole 232 has a first end opened near contact area between the swash plate main body 155 and the plural pistons 130 and a second end opened to the oil chamber 230.

In the configuration, the oil leaked out from the plural pistons 130 mainly flows into the oil chamber 230.

Alternatively, the first end of the communicating hole 232 can be opened to the inner space of the housing 200.

Figure 11:
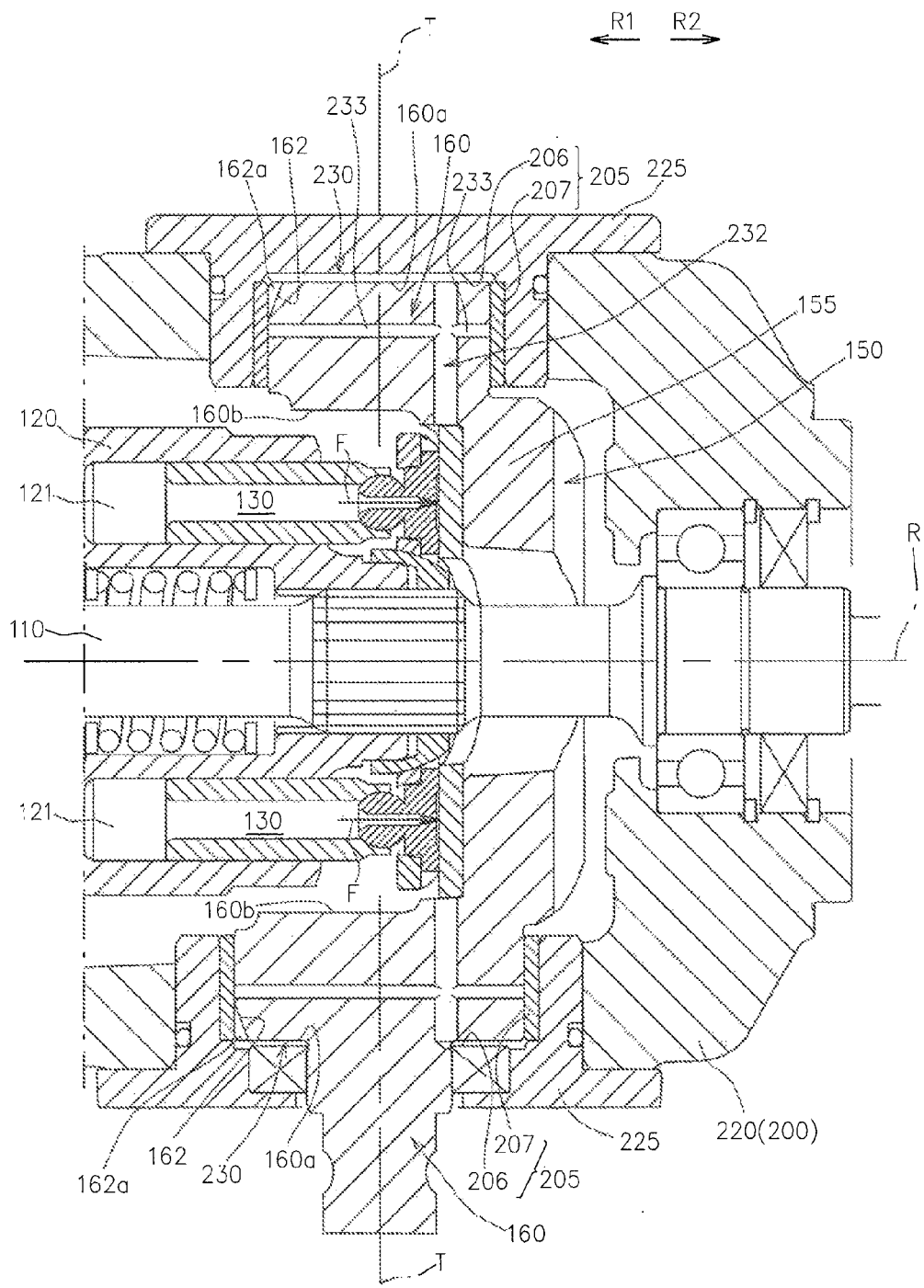
FIG. 11 is a partial cross sectional view of an axial piston device according to a modified example of the embodiment shown in FIG. 10.

As shown in FIG. 11, the trunnion shaft 160 is preferably formed with a lubricating oil passage 233 that is fluidly connected to the communicating oil passage 232 and leads the oil from the communicating oil passage 232 to the contact area between the outer circumferential surface of the trunnion shaft 160 and the inner circumferential surface of the bushing member 207.

The configuration makes it possible to further reduce the rotating frictional resistance of the movable swash plate 150.

In the present embodiment, as explained earlier, the suction groove 162 is formed so as to have the first end opened to the outer end surface 160a of the trunnion shaft 160 and the second end opened to the outer circumferential surface of the trunnion shaft 160. However, the present invention is not limited to the configuration.

Figure 12:
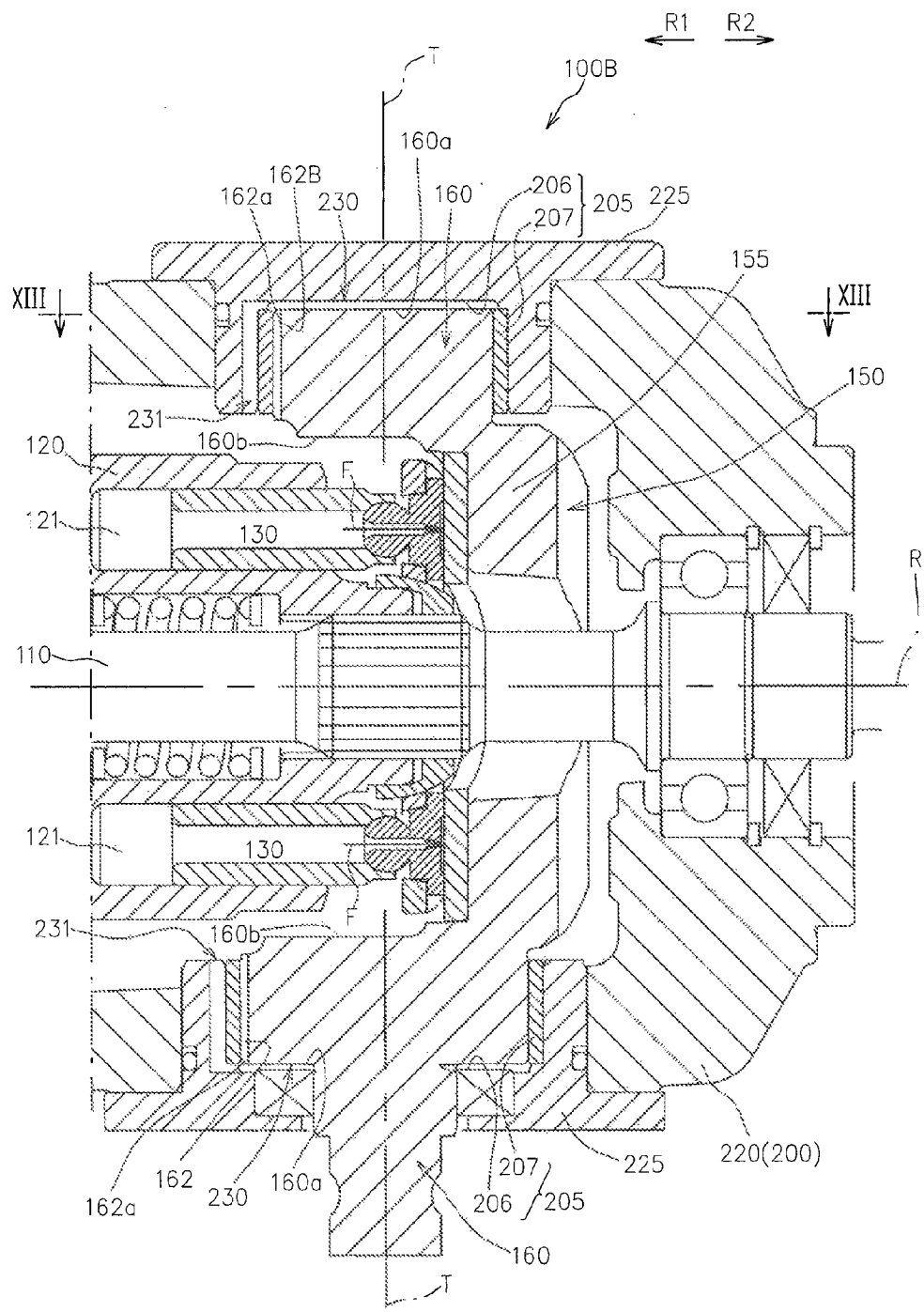
FIG. 12 is a partial cross sectional view of an axial piston device according to still another embodiment of the present invention.

FIG. 12 is a cross sectional view of an axial piston device 100B according to another embodiment of the present invention.

Figure 13:
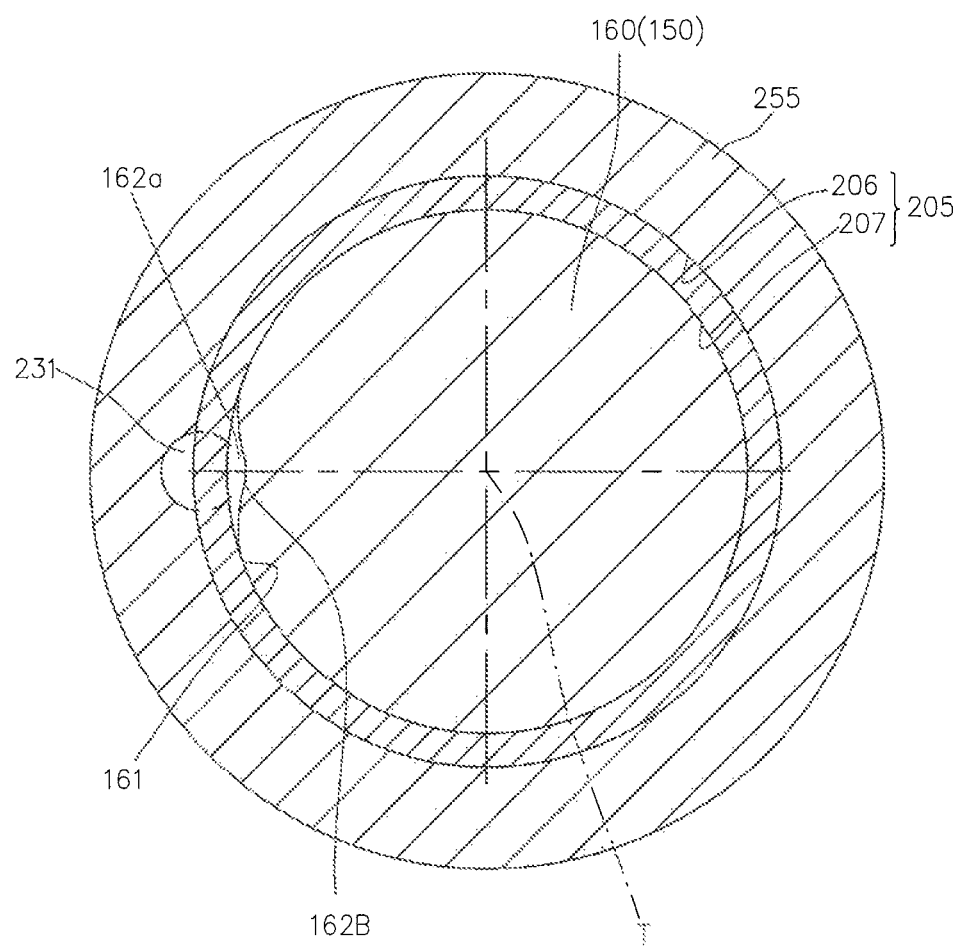
FIG. 13 is a cross sectional view taken along the line in FIG. 12.

FIG. 13 is a cross sectional view taken along the line XIII-XIII in FIG. 12.

In the figures, the identical elements to those in the axial piston device 100 have been given the same reference numerals.

As shown in FIG. 12, the axial piston device 100B includes a suction groove 162B in place of the suction groove 162 in comparison with the axial piston device 100.

The suction groove 162B has a first end opened to the outer end surface 160a of the trunnion shaft 160 and a second end opened to the inner end surface 160b of the trunnion shaft 160.

In this case, in order to effectively prevent a damage of the inner circumferential surface of the bearing portion 205 (the bushing member 207 in the present embodiment) by the rotation of the trunnion shaft 160 around the slanting axis line T, portions of the suction groove 162 that are adjacent to the sliding contact region 161 are formed into a convex shape projecting outward in the radial direction of the slanting axis line T as viewed along the slanting axis line T.

The configuration shown in FIG. 12 is provided with the oil chamber 230. However, in the configuration, the oil chamber 230 can be omitted since the suction groove 162B is opened to the inner end surface 160b of the trunnion shaft 160.

Similarly, the suction groove 162 can be modified to have the first end opened to the inner end surface 160b of the trunnion shaft 160 rather than the outer end surface 160a.

In the modified example, the oil chamber 230 as well as the communicating groove 231 or the communicating hole 232 can be omitted.

In the present embodiment and the configuration shown in FIG. 12, the outer circumferential surface of the trunnion shaft 160 includes the sliding contact region 161 and the suction groove 162 (162B). However, alternatively, a configuration shown in FIG. 14 can be also utilized.

Figure 14:
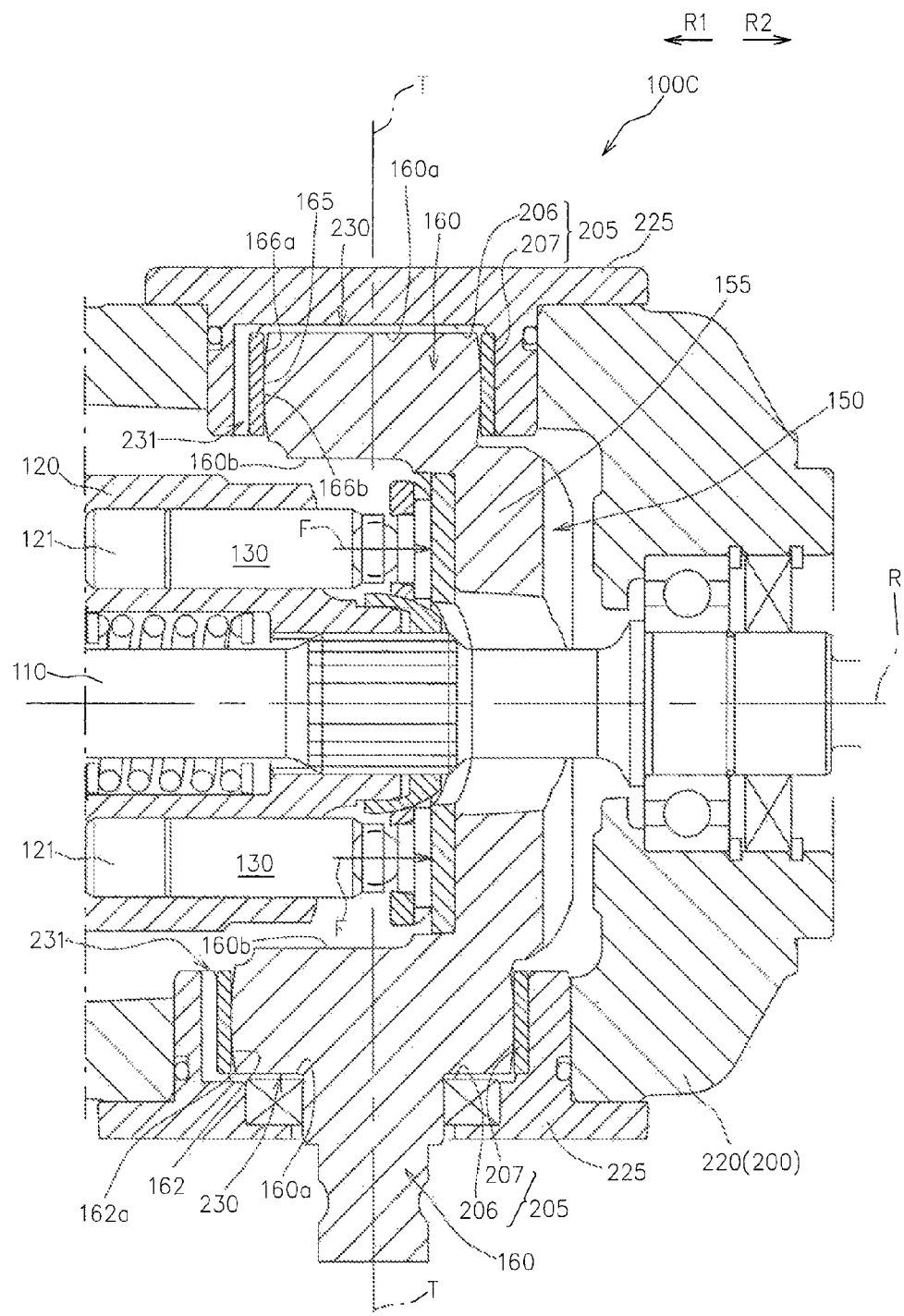
FIG. 14 is a partial cross sectional view of an axial piston device according to further still another embodiment of the present invention.

FIG. 14 is a cross sectional view of an axial piston device 100C according to still another embodiment of the present invention.

In the figure, the identical elements to those in the axial piston devices 100, 100B have been given the same reference numerals.

As shown in FIG. 14, in the axial piston device 100C, the outer circumferential surface of the trunnion shaft 160 includes a large diameter portion 165 that is positioned at a middle part in the axis line and is brought into contact with the inner circumferential surface of the bearing portion 205 (the bushing member 207 in the illustrated embodiment) in a rotatably slidable manner, an outer side small diameter portion 166a that is positioned on the outside of the large diameter portion 165 in the axis line and is gradually away from the inner surface of the bearing portion 205 as it goes outward in the axis line, and an inner side small diameter portion 166b that is positioned on the inside of the large diameter portion 165 in the axis line and is gradually away from the inner surface of the bearing portion 205 as it goes inward in the axis line.

The axial piston device 100C also can effectively reduce the rotating frictional resistance of the movable swash plate 150 at the time when it is being slanted.

The invention claimed is:

1. A variable displacement axial piston device comprising:
    a cylinder block that rotates around a rotational axis line;
    a plurality of pistons that are accommodated in the cylinder block in a relatively non-rotatable manner around the rotational axis line with respect thereto and in a reciprocating manner along the rotational axis line with respect thereto;
    a trunnion type movable swash plate capable of varying a reciprocating range in which the plurality of pistons can move; and
    a housing that accommodates the cylinder block, wherein the movable swash plate includes a swash plate main body that has an engagement surface with which free ends of the plurality of pistons are engaged, and a trunnion shaft that extends outward in a radial direction of the rotational axis line and is supported in a rotatable manner by a bearing portion provided in the housing so as to be located coaxially with a slanting axis line,
    wherein an outer circumferential surface of the trunnion shaft includes a sliding contact region that has a circular arc shape as viewed along the slanting axis line and is brought into contact with an inner circumferential surface of the bearing portion in a rotatably sliding manner, and at least one suction groove in the inner circumferential surface of the bearing portion that forms a pocket portion between the suction groove and the inner circumferential surface of the bearing portion, and
    wherein the pocket portion is opened to an inner space of the housing on at least one side in an axis line direction of the trunnion shaft.

2. A variable displacement axial piston device according to claim 1,
    wherein the movable swash plate is slantable around the slanting axis line within a predetermined operable range including a neutral position, and
    wherein the suction groove is provided at the trunnion shaft so as to be positioned on a side toward a first direction in which the plurality of pistons move when they return into the cylinder block from an imaginary plane, which passes the slanting axis line and is orthogonal to the rotational axis line, regardless of a position at which the movable swash plate is slanted within the predetermined operable range.

3. A variable displacement axial piston device according to claim 2,
wherein the predetermined operable range is defined by a normal rotating direction maximum slanting position at which the movable swash plate is positioned when it is slanted from the neutral position toward one side around the slanting axis line to a maximum degree and a reverse rotating direction maximum slanting position at which the movable swash plate is positioned when it is slanted from the neutral position toward another side around the slanting axis line to a maximum degree, and
wherein the suction groove is arranged so as to be farthest away toward the first direction from the imaginary plane when the movable swash plate is positioned at the neutral position.

4. A variable displacement axial piston device according to claim 3,
wherein the bearing portion includes a concave portion that is provided at the housing so as to be opened inward in a radial direction of the rotational axis line, and a bushing member inserted into the concave portion,
wherein the trunnion shaft includes the outer circumferential surface that is brought into contact with an inner circumferential surface of the bushing member in a rotatably sliding manner, an outer end surface that faces outward in the radial direction of the rotational axis line, and an inner end surface that faces inward in the radial direction of the rotational axis line,
wherein the concave portion, the bushing member and the trunnion shaft are arranged so that an oil chamber is formed between the outer end surface and a bottom surface of the concave portion, and
wherein the suction groove has a first end terminated at the outer end surface so as to communicate with the oil chamber and a second end terminated at an area of the outer circumferential surface halfway between the inner and the outer end surfaces.

5. A variable displacement axial piston device according to claim 4, wherein the oil chamber is fluidly connected to a contact area between the swash plate main body and the plurality of pistons through a communicating hole formed in the trunnion shaft.

6. A variable displacement axial piston device according to claim 4, wherein the oil chamber is fluidly connected to the inner space of the housing through a communicating groove formed in the concave portion.

7. A variable displacement axial piston device according to claim 6, wherein the communicating groove is located at the same position as the suction groove around the slanting axis line at the time when the movable swash plate is located at a neutral position.

8. A variable displacement axial piston device according to claim 2,
wherein the bearing portion includes a concave portion that is provided at the housing so as to be opened inward in a radial direction of the rotational axis line, and a bushing member inserted into the concave portion,
wherein the trunnion shaft includes the outer circumferential surface that is brought into contact with an inner circumferential surface of the bushing member in a rotatably sliding manner, an outer end surface that faces outward in the radial direction of the rotational axis line, and an inner end surface that faces inward in the radial direction of the rotational axis line,
wherein the concave portion, the bushing member and the trunnion shaft are arranged so that an oil chamber is formed between the outer end surface and a bottom surface of the concave portion, and
wherein the suction groove has a first end terminated at the outer end surface so as to communicate with the oil chamber and a second end terminated at an area of the outer circumferential surface halfway between the inner and the outer end surfaces.

9. A variable displacement axial piston device according to claim 8, wherein the oil chamber is fluidly connected to a contact area between the swash plate main body and the plurality of pistons through a communicating hole formed in the trunnion shaft.

10. A variable displacement axial piston device according to claim 8, wherein the oil chamber is fluidly connected to the inner space of the housing through a communicating groove formed in the concave portion.

11. A variable displacement axial piston device according to claim 10, wherein the communicating groove is located at the same position as the suction groove around the slanting axis line at the time when the movable swash plate is located at a neutral position.

12. A variable displacement axial piston device according to claim 1,
wherein the bearing portion includes a concave portion that is provided at the housing so as to be opened inward in a radial direction of the rotational axis line, and a bushing member inserted into the concave portion,
wherein the trunnion shaft includes the outer circumferential surface that is brought into contact with an inner circumferential surface of the bushing member in a rotatably sliding manner, an outer end surface that faces outward in the radial direction of the rotational axis line, and an inner end surface that faces inward in the radial direction of the rotational axis line,
wherein the concave portion, the bushing member and the trunnion shaft are arranged so that an oil chamber is formed between the outer end surface and a bottom surface of the concave portion, and
wherein the suction groove has a first end terminated at the outer end surface so as, to communicate with the oil chamber and a second end terminated at an area of the outer circumferential surface halfway between the inner and the outer end surfaces.

13. A variable displacement axial piston device according to claim 12, wherein the oil chamber is fluidly connected to a contact area between the swash plate main body and the plurality of pistons through a communicating hole formed in the trunnion shaft.

14. A variable displacement axial piston device according to claim 12, wherein the oil chamber is fluidly connected to the inner space of the housing through a communicating groove formed in the concave portion.

15. A variable displacement axial piston device according to claim 14, wherein the communicating groove is located at the same position as the suction groove around the slanting axis line at the time when the movable swash plate is located at a neutral position.

16. A variable displacement axial piston device according to claim 1, wherein the trunnion shaft includes the outer circumferential surface, an outer end surface that faces outward in the radial direction of the rotational axis line, and an inner end surface that faces inward in the radial direction of the rotational axis line, wherein the suction groove has a first end opened to the outer end surface and a second end opened to the inner end surface, and wherein portions of the suction groove that are adjacent to the sliding contact region are formed into a convex shape projecting outward in the radial direction of the slanting axis line as viewed along the slanting axis line.

* * * * *